United States Patent [19]
Sakata et al.

[11] Patent Number: 6,110,234
[45] Date of Patent: Aug. 29, 2000

[54] METHOD OF MANUFACTURING SOLID ELECTROLYTIC CAPACITOR

[75] Inventors: Koji Sakata; Toshihiko Nishiyama; Takashi Fukaumi; Satoshi Arai, all of Toyama, Japan

[73] Assignee: NEC Corporation, Tokyo, Japan

[21] Appl. No.: 09/120,736

[22] Filed: Jul. 23, 1998

[30] Foreign Application Priority Data

Jul. 24, 1997 [JP] Japan .................................. 9-198845

[51] Int. Cl.[7] .............................. H01G 9/00; H01G 9/02
[52] U.S. Cl. ...................... 29/25.03; 361/523; 361/525
[58] Field of Search ....................... 29/25.03; 361/523, 361/525

[56] References Cited

U.S. PATENT DOCUMENTS

| | | | |
|---|---|---|---|
| 4,697,001 | 9/1987 | Walker et al. | 528/423 |
| 4,780,796 | 10/1988 | Fukuda et al. | 361/433 |
| 4,803,596 | 2/1989 | Hellwig et al. | 361/525 |
| 5,428,500 | 6/1995 | Nishiyama et al. | 361/525 |
| 5,457,862 | 10/1995 | Sakata et al. | 29/25.03 |
| 5,461,537 | 10/1995 | Kobayashi et al. | 361/525 |
| 5,986,046 | 11/1999 | Nishiyama et al. | 528/423 |

FOREIGN PATENT DOCUMENTS

| | | |
|---|---|---|
| 7-70294 | 3/1995 | Japan . |
| 8-45790 | 2/1996 | Japan . |

OTHER PUBLICATIONS

Kudoh et al., "Tantalum Solid Electrolytic Capacitor with Polypyrrole Electrolyte Prepared by Chemical Polymerization Using Aqueous Solution", *Denki Kagaku*, vol. 64, No. 1, Jan. 1996, pp. 41–46.

*Primary Examiner*—John F. Niebling
*Assistant Examiner*—Ha Tran Nguyen
*Attorney, Agent, or Firm*—Sughrue, Mion, Zinn, Macpeak & Seas, PLLC

[57] ABSTRACT

In a method of manufacturing a solid electrolytic capacitor, an oxide film as a dielectric layer is formed on a surface of a sintered body formed from a valve action metal and having an anode lead. A solid electrolytic layer essentially consisting of a conductive polymer is formed on the dielectric layer. In the step of forming the solid electrolytic layer, the sintered body having the dielectric layer is dipped in an oxidant solution, and the oxidant solution on the surface of the extracted sintered body is evaporated. Then, the sintered body is dipped in a monomer solution prepared by dissolving a conductive polymeric monomer in a solution in which the oxidant is not dissolved, and the monomer solution on the surface of the extracted sintered body is evaporated to form the conductive polymer layer.

7 Claims, 6 Drawing Sheets

METHOD OF MANUFACTURING SOLID ELECTROLYTIC CAPACITOR

BACKGROUND OF THE INVENTION

The present invention relates to a method of manufacturing a solid electrolytic capacitor and, more particularly, to a method of manufacturing a solid electrolytic capacitor using a conductive polymer as a solid electrolyte.

Electrolytic capacitors using a valve action metal such as tantalum or aluminum are popularly used. As a characteristic feature of such an electrolytic capacitor, the surface area of a dielectric layer is increased (surface extension) in the form of a sintered body or an etching foil, so a large capacitance can be obtained in a small size. However, since an electrolyte of manganese dioxide or ethylene glycol is used, the impedance becomes high at a high frequency.

Along with recent progress in compact and high-performance electronic devices, high-frequency and digital electrical circuits also make an advance, and demand for capacitors having excellent high-frequency characteristics has arisen. To meet this requirement, solid electrolytic capacitors using, as a solid electrolyte, a conductive polymer having a conductivity several hundred times higher than that of a conventional electrolyte have been proposed. As the electrolyte of such a solid electrolytic capacitor, a pentacyclic compound as a conductive polymer such as polypyrrole is doped with a dopant to attain a conductivity and used, so the solid electrolytic capacitor has more excellent frequency characteristics than those of a conventional electrolytic capacitor.

This electrolytic capacitor has excellent high-frequency characteristics because of the high conductivity of the electrolyte. In addition, since no thermal hysteresis is added to form the electrolyte, the oxide film is not damaged. Therefore, the reliability is higher than an electrolytic capacitor using a thermal decomposition product such as manganese dioxide as an electrolyte.

To form a conductive polymer on an oxide film, chemical oxidation polymerization or electrolytic oxidation polymerization is mainly used.

In electrolytic oxidation polymerization, no charges can be present on the oxide film as an insulator. For this reason, a precoating layer of a conductive polymer or manganese dioxide is formed on the oxide film by chemical oxidation polymerization, and then, a conductive polymer is formed by electrolytic oxidation polymerization.

However, when the conductive polymer is formed in a sintered body or etching pit by electrolytic oxidation polymerization, the field strength in pores readily differs from that outside the pores. For this reason, the conductive polymer preferentially forms outside the pores with a high field strength, so the capacitor cannot obtain a sufficient coverage. In addition, electrolytic oxidation polymerization requires to control the current value in units of capacitor elements and therefore is not convenient for industrial production.

On the other hand, chemical oxidation polymerization allows batch processing of a lot of capacitor elements and is relatively convenient for industrial production. In recent years, extensive studies have been made for a technique of forming a conductive polymer by chemical oxidation polymerization, and the following reports are presented.

(1) U.S. Pat. No. 4,697,001 (reference 1) discloses polymerization of pyrrole using ferric dodecylbenzenesulfonate or the like as an oxidant.

(2) "Tantal Solid Electrolyte Capacitor with Polypyrrole Electrolyte Prepared by Chemical Polymerization using Aqueous Solution", DENKI KAGAKU, Vol. 64, No. 1, pp. 41–46, January 1996 (reference 2) discloses chemical oxidation polymerization using an aqueous solution containing a pyrrole monomer and a surfactant (sodium alkylnaphthalenesulfonate) and an aqueous solution of an oxidant containing ferric sulfate and a surfactant (sodium alkylnaphthalenesulfonate). In this technique, a sintered body is dipped in the aqueous solution containing the pyrrole monomer and then dipped in the aqueous solution containing ferric sulfate as an oxidant, and this operation is repeated to form a polypyrrole layer.

(3) Japanese Patent Laid-Open No. 8-45790 (reference 3) and Japanese Patent Laid-Open No. 7-70294 (reference 4) disclose chemical oxidation polymerization using a polymerization solution containing a conductive polymeric monomer, an oxidant, and water. In this technique, 2 wt % or more of water are added to a solvent for dissolving both the conductive polymeric monomer and the oxidant.

(4) Chemical oxidation polymerization in which step S21 of dipping a sintered body in the monomer solution, step S22 of drying and polymerizing the monomer solution, step S23 of dipping the sintered body in the oxidant solution, and step S24 of drying and polymerizing the oxidant solution, as shown in FIG. 5, are performed in this sequence is disclosed.

In polymerization disclosed in reference 2 as well, after the step of dipping the sintered body in the monomer solution, the step of dipping the sintered body in the oxidant solution is performed.

However, the above-described prior arts have the following problems.

(1) When a conductive polymer layer is formed by chemical oxidation polymerization disclosed in reference 2 or 3, the capacitor cannot obtain a sufficient coverage, so the leakage current considerably increases in mounting the capacitor on a circuit board.

The reason will be described with reference to FIGS. 4A, 4B, and 6A to 6D. FIG. 4A schematically shows a solid electrolytic capacitor having a conductive polymer formed by the prior art disclosed in reference 2 or 3, and assembled by a known technique. FIG. 4B shows the main part of FIG. 4A.

As shown in FIG. 4B, in the conventional solid electrolytic capacitor, an oxide film 3, a conductive polymer layer 4, a carbon layer 5, and a silver paste layer 6 are sequentially formed on the surface of a tantalum sintered body 1 shown in FIG. 4A, in which a anode lead 2 is implanted. Subsequently, external electrode terminals 7 and 8 are extracted, and the entire structure is molded with an epoxy resin 10, thereby completing the solid electrolytic capacitor.

FIG. 4B schematically shows a state wherein the conductive polymer layer 4 is not sufficiently formed in the capacitor element (sintered body 1), and the conductive polymer layer 4 on the surface of the capacitor element has no sufficient thickness. Reference numeral 9 denotes a conductive adhesive 9; and 15, a gap.

FIGS. 6A to 6D schematically show the capacitor element surface so as to explain the steps in forming the conductive polymer layer in FIG. 5.

FIG. 6A shows a portion near the surface of the oxide film 3 in the conductive polymeric monomer solution dipping step (step S21). FIG. 6A schematically shows a state wherein pores of the tantalum sintered body 1 are sufficiently filled with a conductive polymeric monomer 13a and a conductive polymeric monomer solvent 14a.

FIG. 6B shows the portion near the surface of the oxide film 3 in the conductive polymeric monomer solution drying step (step S22). When the conductive polymeric monomer 13a is a liquid such as pyrrole with a high vapor pressure, evaporation of the conductive polymeric monomer 13a in the pores is conspicuous. FIG. 6B shows a state wherein the conductive polymeric monomer 13a and the conductive polymeric monomer solvent 14a held on the capacitor element surface and in the pores evaporate and decrease.

FIG. 6C shows the portion near the surface of the oxide film 3 in the oxidant solution dipping step (step S23). The pores are filled with an oxidant 11 and an oxidant solvent 12, so the oxidant 11 contacts the conductive polymeric monomer 13a and polymerizes it.

In the conventional combination of reactive solutions, e.g., in the combination of the aqueous solution of a pyrrole monomer and the aqueous solution of ferric sulfate, both solutions use water as a solvent, and the pyrrole 13a as a conductive polymeric monomer held in the pores is readily diffused. For this reason, contact between the pyrrole 13a and the oxidant 11 tends to occur at a portion far from the oxide film surface, and the conductive polymer layer cannot be sufficiently formed on the oxide film 3 in the pores, resulting in a low coverage.

Additionally, the pyrrole 13a diffused in the pores moves toward the element surface and preferentially reacts, near the surface, with the oxidant 11 entering from the element surface, so polypyrrole is preferentially formed near the pore inlet on the surface. Normally, the conductive polymer layer of polypyrrole is preferentially formed near the pore inlet on the capacitor element surface at the early stage of the polymerization cycle because the sintered body is repeatedly dipped in the conductive polymeric monomer solution and the oxidant solution a plurality of number of times.

After this, since the conductive polymeric monomer or oxidant does not enter the pores, the conductive polymer layer 4 is not uniformly formed on the oxide film in the pores, resulting in a low coverage, as shown in FIG. 4B.

Diffusion of pyrrole 13a also occurs on the capacitor element surface, as a matter of course, so the pyrrole 13a is diffused from the capacitor element surface. No polypyrrole is formed on the element surface where the pyrrole 13a is absent, so the polypyrrole film thickness on the element surface becomes nonuniform. Especially, if the number of times of polymerization is small, the oxide film 3 has no polypyrrole at some portions on its surface microscopically.

In mounting the capacitor on a circuit board, thermal stress of the molding resin may be applied to the oxide film 3 to damage the oxide film 3, resulting in an increase in leakage current. When the polypyrrole layer is formed on the oxide film 3, the oxide film 3 locally generates heat as the leakage current increases. The polypyrrole layer formed on the oxide film is thermally oxidized to lose the conductivity. As a result, the current to the defective portion of the oxide film 3 is blocked. That is, even when the leakage current temporarily increases, the current returns to the normal level (insulation restoration function).

However, if no polypyrrole layer is formed on the oxide film 3, the above-described insulation restoration does not take place, as a matter of course, so the increase in leakage current poses a problem. In addition, when the polypyrrole layer formed on the oxide film 3 is thin, the leakage current increases after the capacitor is mounted on the circuit board. Therefore, a sufficient film thickness must be ensured.

The reason why the leakage current increases in mounting the capacitor on the circuit board when the polypyrrole layer is thin is not yet clarified. As a probable reason, a shift is caused in the polypyrrole layer due to thermal stress in mounting the capacitor on the circuit board, and microscopically, some portions of the oxide film have no polypyrrole layer, and the leakage current increases due to the above-described reason.

On the other hand, when the polypyrrole layer is thick, the problem of leakage current in mounting the capacitor on the circuit board can be solved, though the ESR (Equivalent Series Resistance) of the capacitor increases. Conventionally, since the thickness of the polypyrrole layer readily becomes nonuniform, it is difficult to control the film thickness within an appropriate range.

FIG. 6D shows the portion near the surface of the oxide film in the oxidant solution drying step (step S24). The pyrrole 13a and the oxidant 11, which are held in the pores without being diffused into the oxidant solution in the oxidant solution dipping step (step S23) react with each other to form polypyrrole.

For polymerization, steps S21 to S42 in FIG. 5 are repeated a plurality of number of times. After completion of step S24, if an excess oxidant remains on the capacitor element, the residual oxidant 11 reacts with the pyrrole 13a in the subsequent pyrrole solution dipping step (step S21) to form polypyrrole. In this case as well, the oxidant 11 remaining on the capacitor element is eluted and diffused into the pyrrole solution. For this reason, the conductive polymer layer having a sufficient coverage cannot be formed in the pores, and additionally, a sufficient thickness can hardly be ensured on the capacitor element surface.

The reason for this is as follows. In the pyrrole monomer solution dipping step, ferric sulfate held in the pores in advance is eluted and diffused into the aqueous solution of pyrrole because the ferric sulfate is soluble in water.

Since the technique disclosed in reference 3 also uses a solvent for dissolving both the conductive polymeric monomer and the oxidant, the conductive polymeric monomer held in the pores in advance is eluted and diffused into the oxidant solution. For this reason, conductive polymer formation as an object hardly occurs in the capacitor element. In addition, reaction between the oxidant and the conductive polymeric monomer preferentially takes place on the surface of the capacitor element, so the capacitor cannot obtain a sufficient coverage.

As described above, in the prior art disclosed in reference 3, the oxidant is eluted and dissolved into the conductive polymeric monomer solution, and polymerization cannot be efficiently performed on the capacitor element.

(2) As the disadvantage of the technique disclosed in reference 4, the capacitor cannot obtain a sufficient coverage. The reason is as follows. Since the polymerization solution is held at a low temperature of −30° C. or less, the viscosity of the polymerization solution is high, and the pores in the sintered body cannot be sufficiently filled with the polymerization solution.

(3) As the disadvantage of the technique associated with the sequence shown in FIG. 5, the capacitor cannot obtain a sufficient coverage. The reason is as follows. When the conductive polymeric monomer such as pyrrole is a liquid at room temperature and humidity, the conductive polymeric monomer evaporates together with the solvent in drying the conductive polymeric monomer solution (step S22 and FIG. 6B). Especially, for pyrrole having a high vapor pressure, the amount of the remaining conductive polymeric monomer can hardly be controlled to a predetermined amount before oxidant solution dipping, and the conductive polymer formation amount varies.

SUMMARY OF THE INVENTION

It is an object of the present invention to provide a method of manufacturing a solid electrolytic capacitor having a sufficient coverage and capable of preventing an increase in leakage current in mounting the capacitor on a circuit board.

In order to achieve the above object, according to the present invention, there is provided a method of manufacturing a solid electrolytic capacitor comprising the steps of forming an oxide film as a dielectric layer on a surface of a sintered body formed from a valve action metal and having an anode lead, and forming a solid electrolytic layer essentially consisting of a conductive polymer on the dielectric layer, wherein the step of forming the solid electrolytic layer comprises the steps of dipping the sintered body having the dielectric layer in an oxidant solution and evaporating the oxidant solution on the surface of the extracted sintered body, and dipping the sintered body in a monomer solution prepared by dissolving a conductive polymeric monomer in a solution in which the oxidant is not dissolved, and evaporating the monomer solution on the surface of the extracted sintered body to form the conductive polymer layer.

DESCRIPTION OF THE PREFERRED EMBODIMENTS

The present invention will be described below with reference to the accompanying drawings.

Figure 1A:
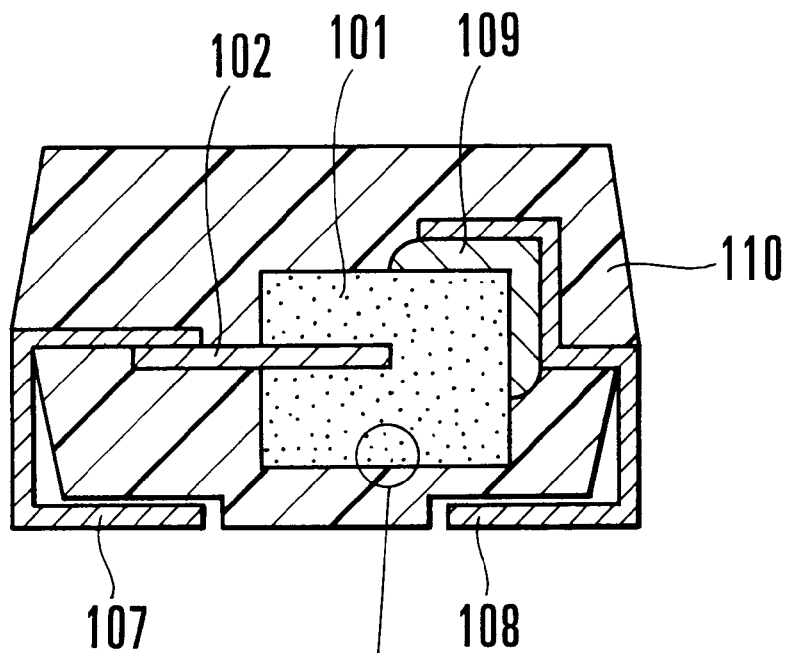
FIG. 1A is a sectional view of a solid electrolytic capacitor of Example 1 of the present invention.
Figure 1B:
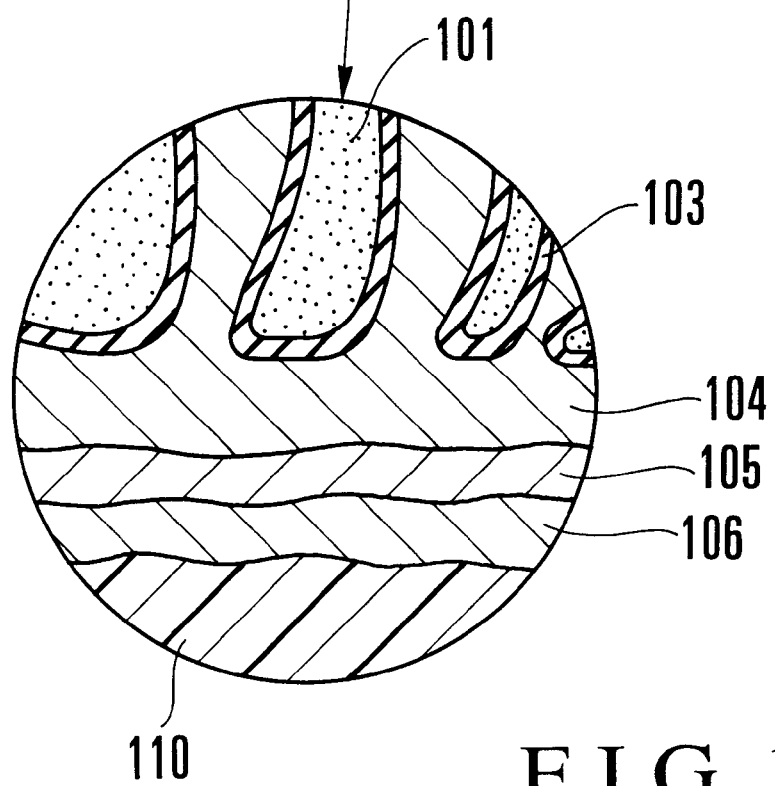
FIG. 1B is an enlarged sectional view of the main part of FIG. 1A.

FIG. 1A shows a solid electrolytic capacitor of Example 1 of the present invention. FIG. 1B shows the main part of the solid electrolytic capacitor shown in FIG. 1A. In the solid electrolytic capacitor shown in FIG. 1A, an anode lead 102 is implanted on a tantalum sintered body by a known technique. An oxide film 103 is formed on a tantalum sintered body 101 to form a capacitor element (1×1×1 mm$^3$) A conductive polymer layer 104 was formed on the capacitor element surface in the following procedure.

Figure 2:
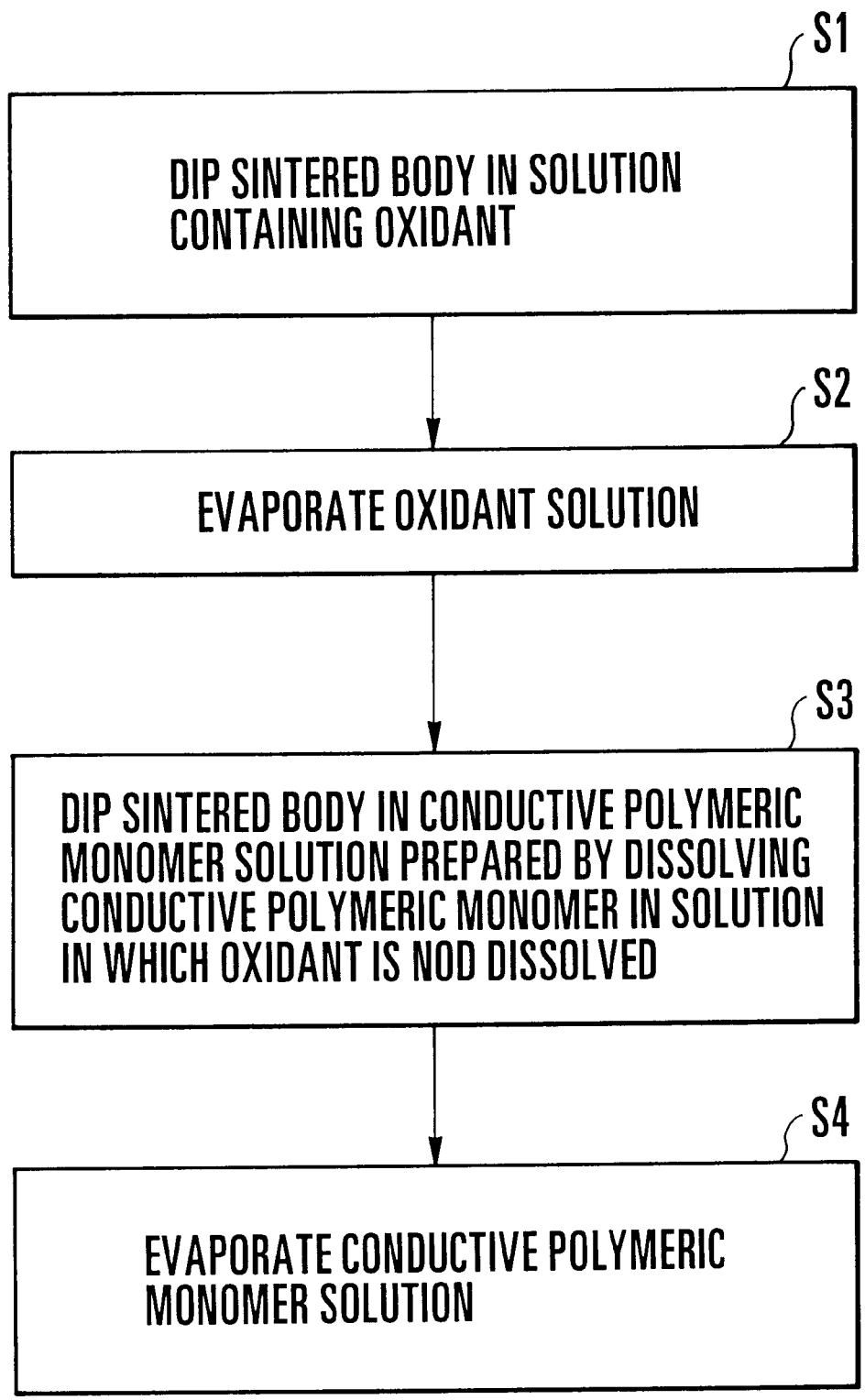
FIG. 2 is a flow chart showing a method of manufacturing the solid electrolytic capacitor shown in FIGS. 1A and 1B.

Fifty wt % of an isopropyl alcohol solution of ferric butylnaphthalenesulfonate as an oxidant solution and 4 wt % of an aqueous solution of pyrrole (pyrrole and water) as a monomer solution were prepared. Polymerization was performed using these solutions in accordance with the flow chart of FIG. 2.

This polymerization will be described with reference to FIGS. 2 and 3A to 3D.

Figure 3A:
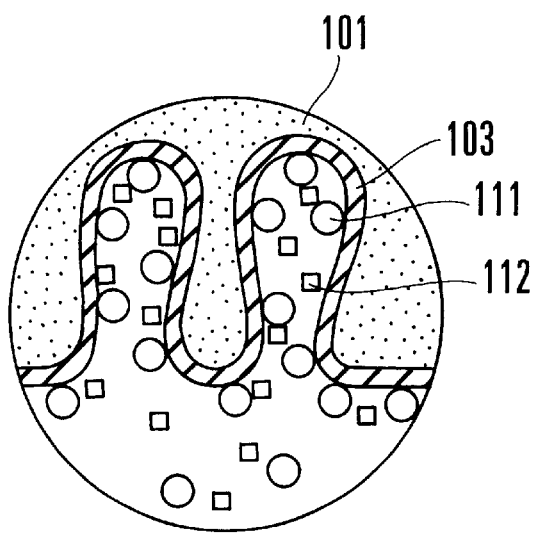
FIGS. 3A to 3D are enlarged sectional views schematically showing the process of forming a conductive polymer shown in FIG. 1B.
Figure 3B:
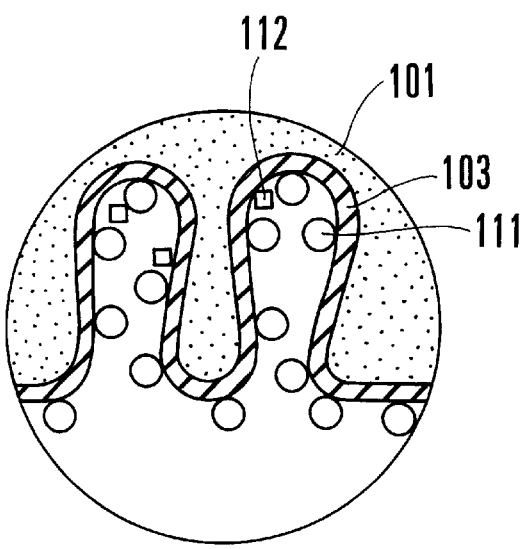

As shown in FIG. 3A, the tantalum sintered body 101 on which the oxide film 103 was formed was dipped in the oxidant solution for 10 min to fill pores with an oxidizing agent 111 and an oxidant solvent 112 (step S1). As shown in FIG. 3B, the oxidant solvent 112 was dried at room temperature for 10 min and removed (step S2).

Figure 3C:
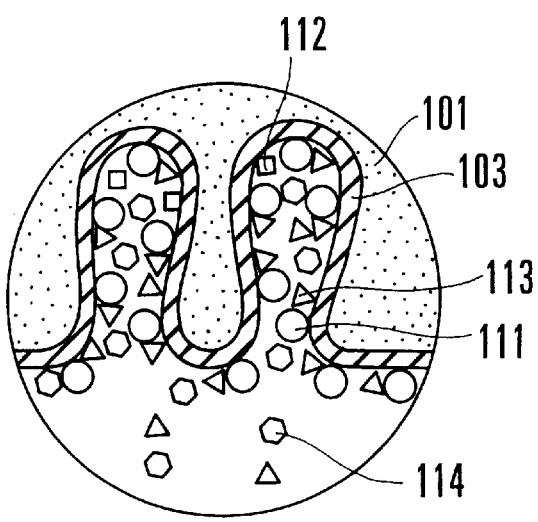
Figure 3D:
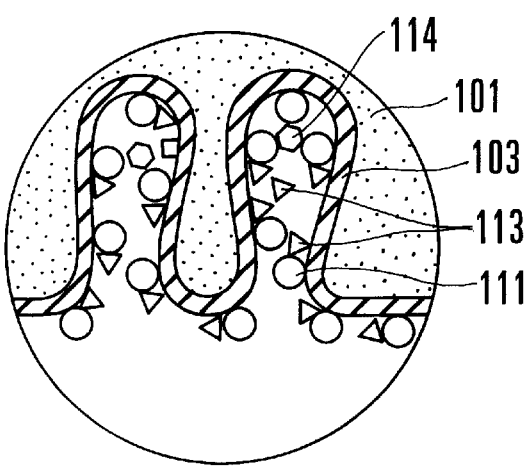

As shown in FIG. 3C, the sintered body was dipped for 10 min in the aqueous solution of pyrrole, which contained a pyrrole monomer 113 and water 114 (step S3). Subsequently, as shown in FIG. 3D, the monomer solution was dried at room temperature for 10 min to remove an excess aqueous solution of pyrrole (step S4).

The series of operations in steps S1 to S4 were repeated 10 times to form the conductive polymer layer 104 on the oxide film 103, as shown in FIG. 1B.

After formation of the conductive polymer layer 104, a carbon layer 105 and a silver paste layer 106 were formed on the conductive polymer layer 104. An external electrode terminal 107 connected to the anode lead 102 and an external electrode terminal 108 connected to the silver paste layer 106 through a conductive adhesive 109 were extracted, and the entire structure is molded with an epoxy resin 110, thereby completing the solid electrolytic capacitor having the structure shown in FIG. 1A.

In this solid electrolytic capacitor, the conductive polymer layer 104 was sufficiently formed into the pores, as shown in FIG. 1B and had a coverage of 90%. The resultant coverage corresponds to the ratio of the capacitance measured in the following procedure.

After the oxide film 103 is formed by a known technique, the capacitor element is dipped in 40 wt % of an aqueous solution of sulfuric acid, and the capacitance is measured. Next, the capacitance of the completed capacitor is measured.

The thickness of the polypyrrole layer formed on the oxide film 103 was 10 μm on the capacitor element surface. Hundred capacitors were mounted on a circuit board through a reflow furnace at 240° C. The leakage current did not largely increase in any samples. The characteristics of the above-described capacitor of Example 1 are shown in Table 1.

When the thickness of the polypyrrole layer (to be referred to as a polypyrrole film thickness hereinafter) on the capacitor element surface is 5 μm or more, the polypyrrole layer is formed on the entire surface of the oxide film 103. Therefore, when a defect is generated in the oxide film 103 due to thermal stress of the epoxy resin 110 as a mold resin used in mounting the capacitor on the circuit board, and the leakage current increases, the oxide film 103 near the defective portion generates heat due to concentration of the current to the defective portion.

The polypyrrole layer on the defective portion is oxidized by generated heat to insulate the defective portion from the current. Therefore, the leakage current of the capacitor decreases and is almost restored to the level before mounting the capacitor on the circuit board (insulation restoration function).

In a polypyrrole layer thinner than 5 μm, the surface of the oxide film 103 partially has portions not covered with the polypyrrole layer when viewed microscopically. If a defect is generated at the oxide film portion not covered with the polypyrrole layer due to thermal stress of the epoxy resin in mounting the capacitor on the circuit board, the insulation restoration function of the polypyrrole layer cannot be obtained. For this reason, the leakage current is kept increased, and the capacitor function is lost.

To the contrary, when the thickness of the polypyrrole layer exceeds an upper limit value (e.g., 100 μm), the ESR reaches the level of the conventional capacitor using manganese dioxide as a solid electrolytic, and the advantage of low impedance at a high frequency, which cannot be obtained in the conventional capacitor, is lost.

Therefore, the polypyrrole film thickness on the capacitor element surface must be at least equal to or more than 5 μm. Preferably, the film thickness is 7 to 20 μm.

Example 2 of the present invention will be described next with reference to FIGS. 1A and 1B. In Example 2, the oxidant solution used in Example 1 was replaced with 50 wt % of an isopropyl alcohol solution of ferric dodecylbenzenesulfonate.

In the capacitor of Example 2 as well, the conductive polymer layer 104 is sufficiently formed in the pores, as in Example 1. The coverage of this capacitor was 92%. The thickness of the polypyrrole layer formed on the oxide film 103 was 15 μm on the capacitor element surface. As in Example 1, 100 capacitors were mounted on a circuit board through a reflow furnace at 240° C. No samples exhibited a large increase in leakage current. The characteristics of the above-described capacitor of Example 2 are shown in Table 1.

Comparative examples will be described next with reference to FIGS. 4A, 4B, 5, and 6A to 6D.

COMPARATIVE EXAMPLE 1

A capacitor element having an oxide film formed as in Example 1, 50 wt % of an aqueous solution of ferric sulfate as an oxidant, and 4 wt % of an aqueous solution of pyrrole as a monomer solution were prepared. Polymerization was performed using these solutions in accordance with the flow chart of FIG. 5.

Figure 6A:
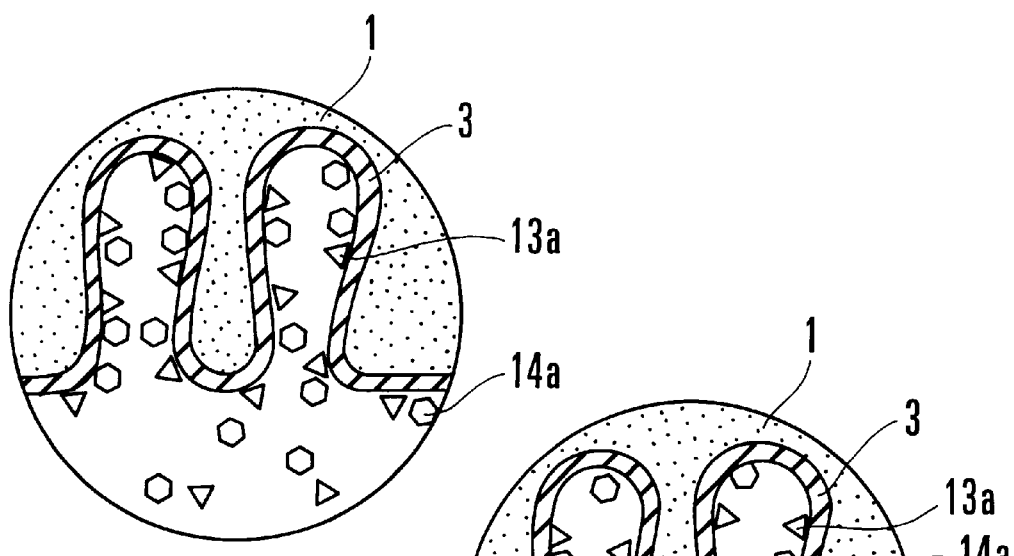
FIGS. 6A to 6D are enlarged sectional views schematically showing the process of forming a conductive polymer by the conventional chemical oxidation polymerization.
Figure 6B:
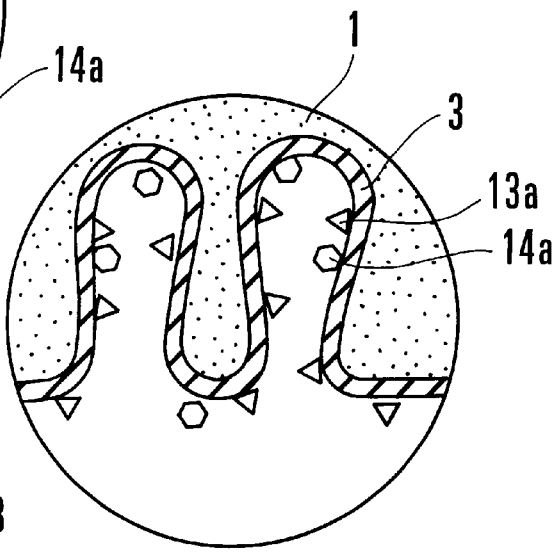
Figure 6C:
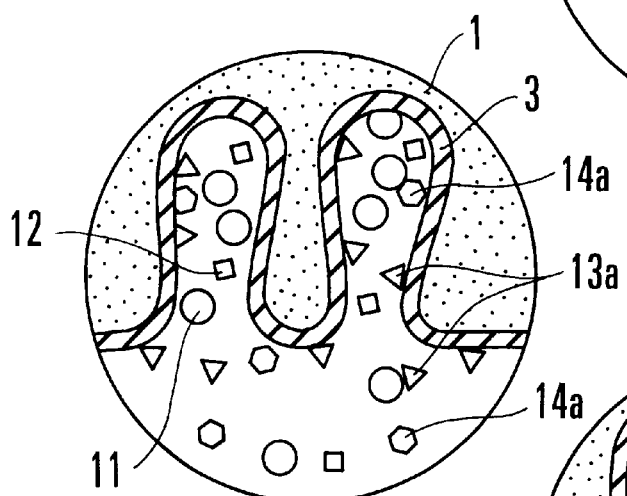
Figure 6D:
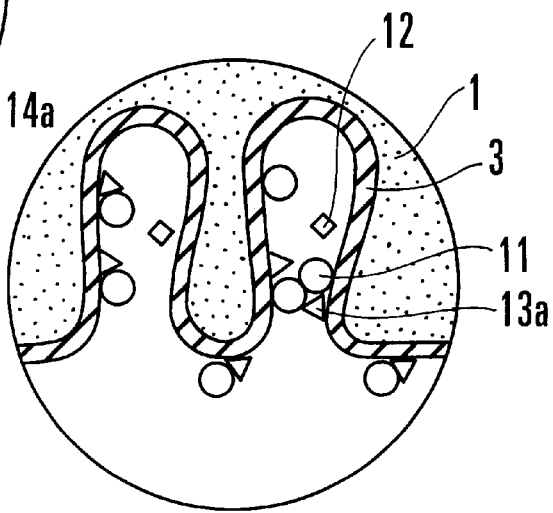

As shown in FIG. 6A, a tantalum sintered body 1 was dipped in the aqueous solution of pyrrole for 10 min to fill pores with pyrrole (step S21). Next, as shown in FIG. 6B, the sintered body was dried at room temperature for 10 min to remove pyrrole and water (step S22). As shown in FIG. 6C, the sintered body was dipped in the aqueous solution of ferric sulfate for 10 min to form polypyrrole (step S23). Subsequently, the sintered body was dried at room temperature for 10 min to remove the oxidant solution of ferric sulfate (step S24). The series of processes in steps S21 to S24 were repeated 10 times to form a conductive polymer layer 4 on an oxide film 3.

Figure 4A:
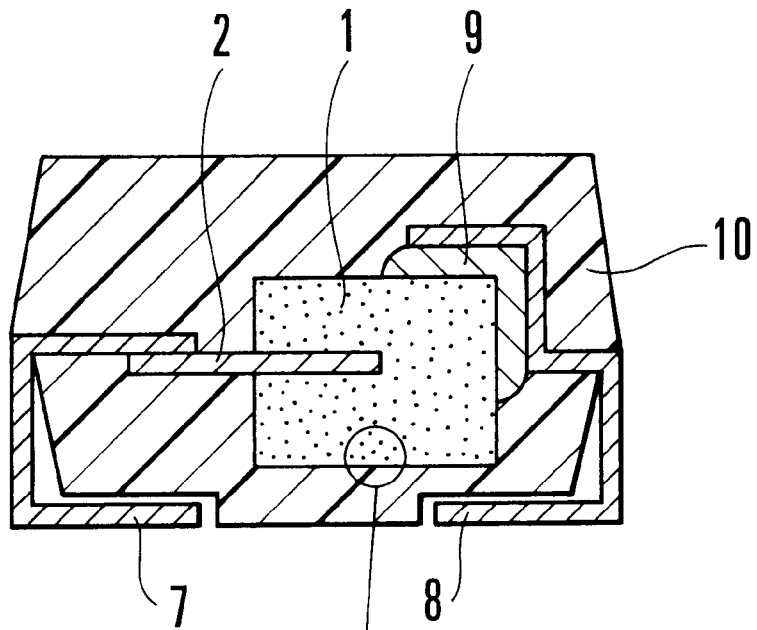
FIG. 4A is an enlarged sectional view of a conventional solid electrolytic capacitor.

A carbon layer 5 and a silver paste layer 6 were formed by a known technique, external electrode terminals 7 and 8 were extracted, and the structure was molded with an epoxy resin 10, thereby completing a solid electrolytic capacitor. The resultant solid electrolytic capacitor had a section as shown in FIGS. 4A and 4B.

Figure 4B:
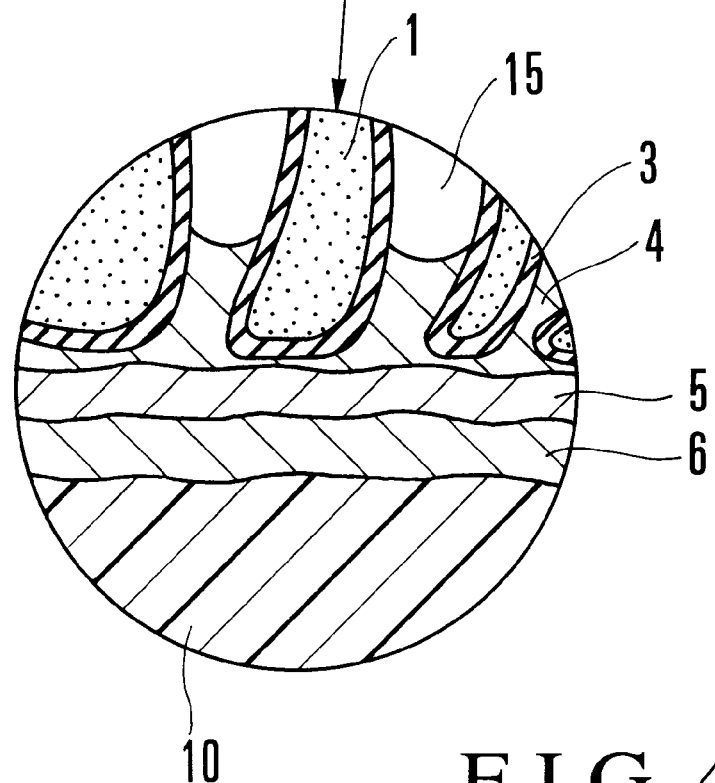
FIG. 4B is an enlarged sectional view of the main part of FIG. 4A.
Figure 5:
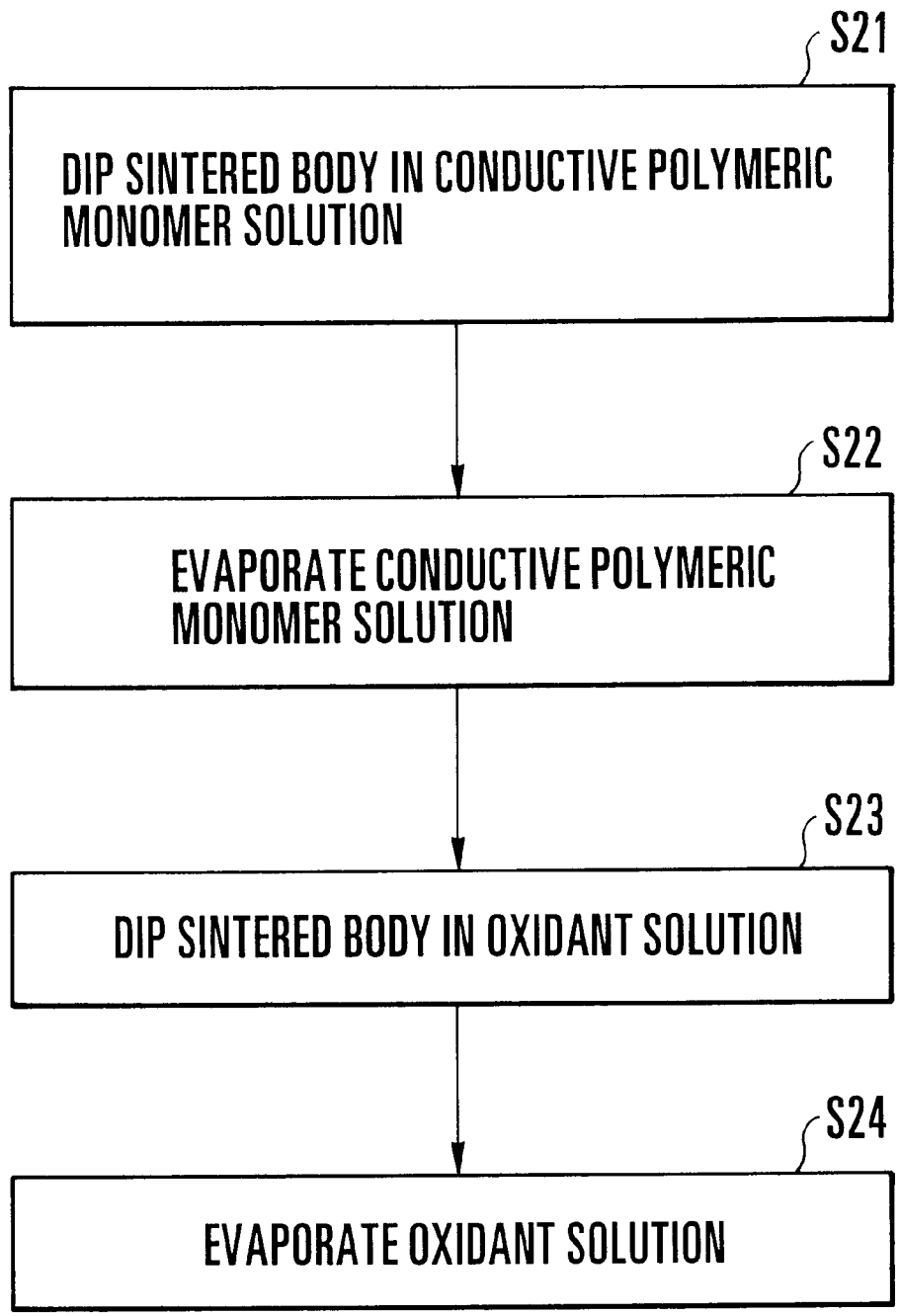
FIG. 5 is a flow chart showing a method of manufacturing the solid electrolytic capacitor shown in FIGS. 4A and 4B.

As shown in FIG. 4B, this solid electrolytic capacitor had gaps 15 in the pores, and the conductive polymer layer 4 was not sufficiently formed. For this reason, the coverage of this capacitor was 60%. The polypyrrole layer formed on the oxide film 3 had a thickness of 1 μm or less at the thinnest portion on the capacitor element surface. The polypyrrole layer was apparently thinner than that of Example 1 or 2 and nonuniform. When 100 capacitors were mounted on a circuit board through a reflow furnace at 240° C., 30 samples exhibited leakage current failures. The characteristics of the above-described Comparative Example 1 are shown in Table 1.

COMPARATIVE EXAMPLE 2

Instead of the oxidant solution of Comparative Example 1, a methanol solution of ferric p-toluene sulfonate was used to manufacture a solid electrolytic capacitor in the same procedure as in Comparative Example 1.

This solid electrolytic capacitor also had portions where the conductive polymer layer 4 was not sufficiently formed in the pores, like Comparative Example 1. The coverage of this capacitor was 65%. The polypyrrole layer formed on the oxide film 3 had a thickness of 1 μm or less at the thinnest portion on the capacitor element surface. The polypyrrole layer was apparently thinner than that of Example 1 or 2 and nonuniform. When 100 capacitors were mounted on a circuit board through a reflow furnace at 240° C., 25 samples exhibited leakage current failures. The characteristics of the above-described Comparative Example 2 are shown in Table 1.

TABLE 1

Characteristics of Solid Electrolytic Capacitors

|  | Coverage | Polypyrrole Film Thickness on Element Surface | Number of Leakage Current Failures in Mounting Capacitors on Circuit Board |
| --- | --- | --- | --- |
| Example 1 | 90% | 10 μm | 0/100 samples |
| Example 2 | 92% | 15 μm | 0/100 samples |
| Comparative Example 1 | 60% | 1 μm or less | 30/100 samples |
| Comparative Example 2 | 65% | 1 μm or less | 25/100 samples |

As described above, in the conventional chemical oxidation polymerization, the capacitor cannot obtain a sufficient coverage, and a conductive polymer layer having a sufficient thickness resistant to thermal stress in mounting the capacitor on a circuit board can hardly be formed.

To the contrary, in chemical oxidation polymerization of the present invention, the capacitor has a sufficient coverage, and the conductive polymer layer 104 sufficiently thick to resist thermal stress in mounting the capacitor on a circuit board can be formed.

The reason for this is as follows. Since the oxidant 111 held in the pores in advance is not eluted into the solvent (water) 114 of a pyrrole monomer as a conductive polymer, so the oxidant is held in the pores. The pyrrole monomer 113 contacts the held oxidant 111 to form a pyrrole polymer. Therefore, the conductive polymer layer is sufficiently formed in the pores. Simultaneously, since the oxidant is also held on the capacitor element surface, the conductive polymer layer 104 can be formed uniformly.

When pyrrole is to be used as the conductive polymer 104, the steps of dipping the sintered body in the oxidant solution and drying the sintered body in chemical oxidation polymerization are preferably performed first. The reason for this is as follows. In chemical oxidation polymerization wherein the pores are sequentially filled with the conductive polymeric monomer and the oxidant, the conductive polymer formation amount depends on the substance filled first. In use of pyrrole as the conductive polymeric monomer, when the pores are filled with pyrrole first, and the sintered body is dried, the amount of pyrrole immediately before dipping the sintered body in the oxidant solution is difficult to control because of the high vapor pressure of pyrrole.

However, when the pores are filled with the oxidant solution first, and the sintered body is dried, the oxidant containing transition metal ions such as $Fe^{3+}$, $Cu^{2+}$, or $Zn^{2+}$, and an aromatic compound having an electron donor, such as alkylbenzenesulfonic acid or alkylnaphthalenesulfonic acid, does not evaporate. For this reason, the amount held in the pores when the sintered body is pulled up from the oxidant solution is kept until the sintered body is dipped in the conductive polymeric monomer solution.

The amount held in the pores upon pulling up the sintered body from the oxidant solution can be easily controlled only by controlling the viscosity of the oxidant and the pulling speed, so the conductive polymer formation amount can be controlled. Therefore, an excellent capacitor having a sufficient coverage and capable of preventing an increase in leakage current in mounting the capacitor on a circuit board can be manufactured.

The above-described function results from a combination of specific solutions associated with polymerization solutions. As the oxidant, a salt containing a transition metal ions such as $Fe^{3+}$, $Cu^{2+}$, or $Zn^{2+}$, and an aromatic compound having an electron donor, such as alkylbenzenesulfonic acid or alkylnaphthalenesulfonic acid, is used. The above function can be obtained when a solution in which the oxidant is not dissolved is used as the conductive polymeric monomer solution.

This point is based on a concept different from the combination of polymerization solutions disclosed in the prior art, e.g., reference 2, i.e., the combination of the aqueous solution of ferric sulfate and the aqueous solution of pyrrole.

In addition, the function resulting from the sequence of the processes of dipping the sintered body in the oxidant solution and the conductive polymeric monomer solution when the conductive polymer is limited to pyrrole is also a novel function in the present invention.

As has been described above, according to the present invention, two effects are obtained. As the first effect, a solid electrolytic capacitor having a high coverage can be manufactured. As the second effect, a solid electrolytic capacitor capable of preventing an increase in leakage current in mounting the capacitor on a circuit board can be manufactured.

What is claimed is:

1. A method of manufacturing a solid electrolytic capacitor, comprising the steps of:

forming an oxide film as a dielectric layer on a surface of a sintered body formed from a valve action metal and having an anode lead; and forming a solid electrolytic layer essentially consisting of a conductive polymer on the dielectric layer, wherein the step of forming the solid electrolytic layer comprises the steps of dipping the sintered body having the dielectric layer in an oxidant solution and evaporating the oxidant solution on the surface of the sintered body, and dipping the sintered body in a monomer solution prepared by dissolving a conductive polymeric monomer in a solution in which the oxidant is not dissolved, and evaporating the monomer solution on the surface of the sintered body to form the conductive polymer layer.

2. A method according to claim 1, wherein the step of forming the solid electrolytic layer comprises forming the conductive polymer layer using chemical oxidation polymerization of dipping the sintered body in the oxidant solution, evaporating the oxidant solution, dipping the sintered body in the monomer solution, and evaporating the monomer solution in an order named.

3. A method according to claim 1, wherein the oxidant is a salt containing a transition metal ion and an aromatic compound having an electron donor, and a solvent of the monomer solution is water.

4. A method according to claim 3, wherein the transition metal ion is a material selected from the group consisting of $Fe^{3+}$, $Cu^{2+}$, and $Zn^{2+}$, and the aromatic compound is a material selected from the group consisting of alkylbenzenesulfonic acid and alkylnaphthalenesulfonic acid.

5. A method according to claim 1, wherein the conductive polymeric monomer is pyrrole.

6. A method according to claim 5, wherein a thickness of the pyrrole layer is equal to or more than 5 $\mu$m.

7. A method according to claim 1, further comprising the steps of sequentially forming a carbon layer and a silver paste layer on the surface of the sintered body on which the solid electrolytic layer is formed, and forming a pair of external electrode terminals respectively connected to the anode lead and the silver paste layer and then molding the sintered body with a molding resin.

* * * * *